United States Patent [19]  
Paterson

[11] Patent Number: 4,917,526  
[45] Date of Patent: Apr. 17, 1990

[54] CLEVIS ASSEMBLY FOR HANGING AIRBORNE STORES

[75] Inventor: Peter S. Paterson, Bellevue, Wash.

[73] Assignee: The Boeing Company, Seattle, Wash.

[21] Appl. No.: 913,033

[22] Filed: Sep. 29, 1986

[51] Int. Cl.⁴ .............................................. F16C 11/10
[52] U.S. Cl. ....................................... 403/79; 403/93; 403/113; 89/1.57
[58] Field of Search ............... 403/79, 91, 92, 150, 403/152, 157, 161, 317, 315, 322, 12, 375, 383, 57, 61, 78, 355, 356, 409.1, 93, 96, 95, 116, 348, 113, 159, 154, 59; 89/1.58, 1.57, 1.53, 1.54; 244/137.4; 16/361, 348

[56] References Cited

U.S. PATENT DOCUMENTS

| 607,779 | 7/1898 | Welch et al. | 403/113 X |
| 1,030,527 | 6/1912 | Nelson | 403/79 X |
| 1,587,678 | 6/1926 | Remington | 403/93 X |
| 2,501,581 | 3/1950 | Rieger | 403/93 X |
| 2,743,895 | 5/1956 | Tygh | 403/79 X |
| 2,852,981 | 9/1958 | Cuya | 89/1.58 |
| 2,900,029 | 8/1959 | Herkimer | 16/348 X |
| 3,163,011 | 12/1964 | Groetschel | 403/93 X |
| 3,999,873 | 12/1976 | Green et al. | 403/152 |
| 4,257,567 | 3/1981 | Hasquenoph et al. | 89/1.57 X |
| 4,416,437 | 11/1983 | Hasquenoph et al. | 89/1.51 X |
| 4,641,395 | 2/1987 | Banks | 16/348 |

FOREIGN PATENT DOCUMENTS 606726 10/1960 Canada ................................ 403/113

Primary Examiner—Andrew V. Kundrat  
Assistant Examiner—Peter M. Cuomo  
Attorney, Agent, or Firm—J. Michael Neary

[57] ABSTRACT

A clevis assembly having a folding clevis for supporting an air launched missile has an attached pivot pin having a non-round cross section which rotates in a elongated hole in the sides of the clevis block in which the clevis lies in its stowed position. When the clevis is extended in position to engage the hooks on the missile ejector, the pivot pin is raised in the elongated hole to its upper position in which the non-round profile of the pin fits into the non-round profile of the elongated hole in the side of the recess in which it is mounted so that the pin cannot rotate. This provides a longitudinal restraint of the missile on the ejector because the clevis is prevented from rotation.

25 Claims, 2 Drawing Sheets

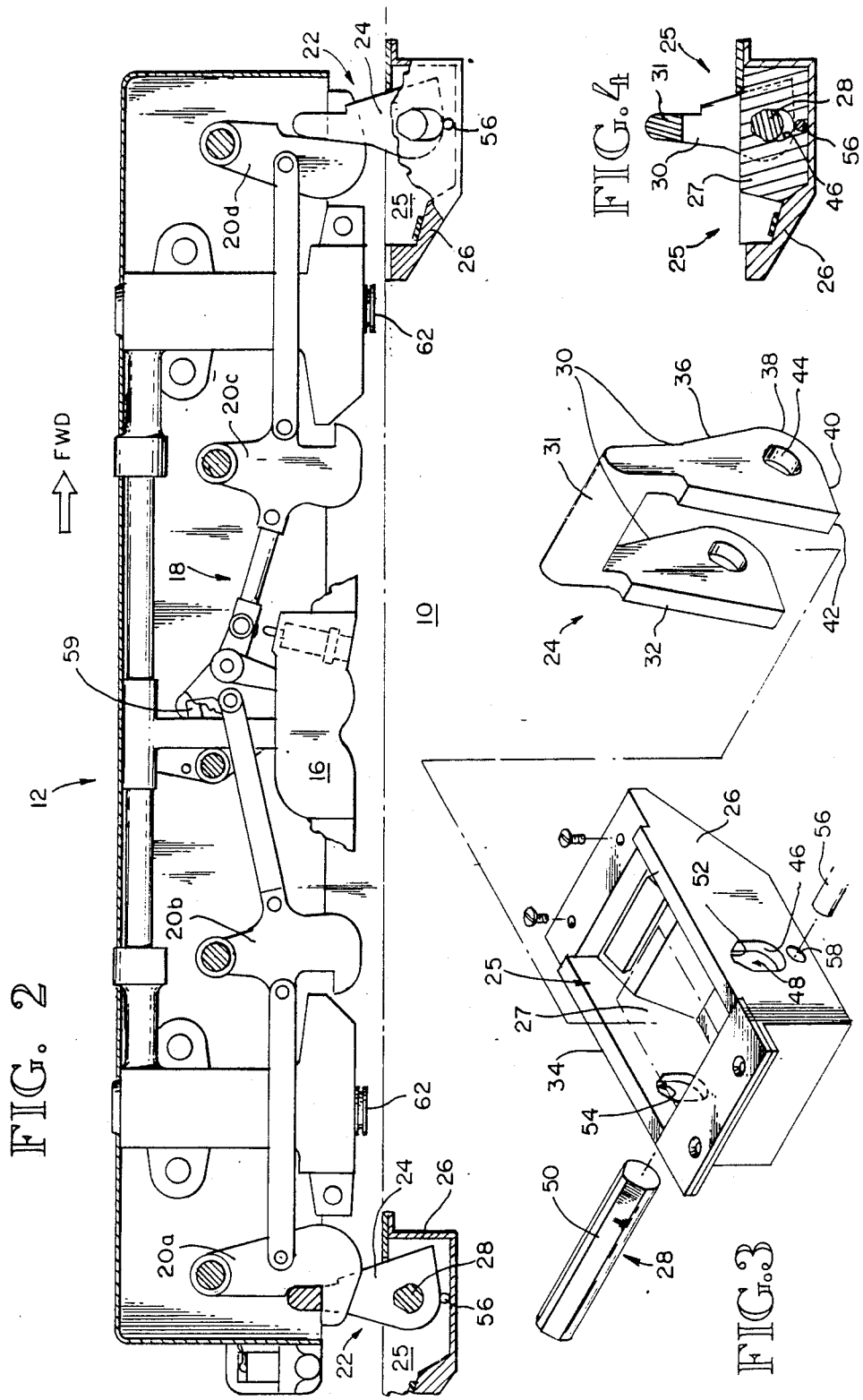

CLEVIS ASSEMBLY FOR HANGING AIRBORNE STORES

BACKGROUND OF THE INVENTION

FIELD OF INVENTION

This invention relates to lugs for hanging airborne stores from an aircraft, and particularly to a clevis assembly having a folding clevis which provides longitudinal restraint of the store when the store is carried by the aircraft, and which retracts and rotates into a recess out of the airstream when the store is released from the aircraft.

"Airborne stores" are articles designed to be carried by aircraft, typically suspended from an ejector or rack secured to the underside of the wings or fuselage, often in such a manner that the store can be ejected or dropped at the desired time by triggering the ejector or rack from within the aircraft to release and eject the store. The best known type of airborne stores are munitions such as bombs and missiles, but they may also include jettisonable external fuel tanks, rescue equipment, emergency supplies, chaff, flares, and so forth.

The basic function of a lug for an airborne store is to provide an attachment point by which the store can be hung from the aircraft. It also provides a convenient "handle" for lifting and moving heavy, delicate or explosive stores on the ground, using techniques and equipment that ensure that it will not be dropped or impacted against other structure.

Another function of a lug is to enable the store to be secured against side-to-side or lateral motion while carried by an aircraft in flight. Normally, lateral restraint is provided by two sets of laterally extending sway braces which firmly engage the store at laterally spaced positions on both sides of the lugs. The lug provides the reaction lifting force to the laterally spaced pushing forces exerted by the sway braces.

Fore-and-aft or longitudinal restraint is provided, for stores with non-retracting or fixed lugs, by the vertical rigidity or torque resistance of the fixed lugs. Longitudinal restraint is important, not merely to prevent motion of the store in the fore-and-aft direction, but also to ensure that the store is released from both sets of shackles when the ejector operates. If the store were free to move to the rear when the shackles release, the line of action of one over-center shackle could shift into alignment with the lug, and the store might then hang up on the forward shackle instead of releasing cleanly. This is a very dangerous situation for the pilot of an ordnance delivery aircraft: he cannot land safely until the munition is released or secured, so he must attempt to shake the munition loose without causing it to swing violently against the aircraft. If he is unable to dislodge the hanging munition the only recourse is for the pilot to eject from the aircraft and allow it to crash. This presents an unacceptable danager to the pilot and an unacceptable risk of loss of expensive aircraft. The armed services, therefore, are keenly interested in obtaining very reliable hardware for hanging and releasing munitions.

The use of "retracting lugs" has occurred recently in the field of munitions, primarily to improve the performance characteristics of high speed maneuverable ordnance such as missiles and "smart" bombs. A lug projecting into the airstream past an airborne vehicle produces an unbalanced drag which is roughly proportional to the square of the airspeed, so the use of a "retracting lug" to avoid the adverse aerodynamic effect on high speed munitions becomes increasingly significant as the speed and maneuverability increase. (The term "retracting lug" is actually a literal contradiction since the term "lug" implies a fixed or non-retracting attachment ring or clevis. A more accurate term, and the one used hereinafter, for a folding or retracting attachment point for an airborne store is "folding clevis.")

Another important advantage of the folding clevis is its low radar cross-section. The newly emerging sophisticated defense systems against air launched munitions depend to some extent on radar acquisition and tracking, and these defenses can be nullified to the extent that the radar cross-section of the incoming munitions falls below the sensitivity of the defensive radar. A projecting lug produces a bright radar return signal; a folded clevis can be concealed in such a way as to produce little or no return signal.

The use of the folding clevis in the past has required special ejector modifications to provide the longitudinal restraint previously provided by the fixed lug. Since a folding clevis has no torque resistance in its folding direction (toward the rear or tail of the munition) and since that is the direction in which the primary longitudinal restraint must be applied during aircraft landing, a separate longitudinal restraint has been provided for prior art folding clevises in the form of a shear pin extending from the ejector into a recess in the clevis housing. The pin absorbs the longitudinal inertial forces and prevents longitudinal movement until the ejector hooks disengage from the clevises, allowing the store to drop vertically clear of the shear pin.

Although the shear pin modification has worked well, it has required modification of the ejectors, thereby increasing their size, cost and weight. It would be preferable to modify the clevis to allow it to retract freely into its pocket when released, but which would provide secure longitudinal restraint, equivalent to that of the old fixed lug, when extended.

Another technique to attain longitudinal restraint in a retractable munitions clevis uses a pair of parallel spaced-apart plate-like members, each of which are slotted to receive the clevis and engage the longitudinally facing sides thereof to prevent the clevis from rotating. This technique will prevent rotation of the clevis to the extent that clearance between the clevis and the slot is minimized. As the clearance is minimized, the danger of one clevis becoming jammed in the slot by not-quite simultaneous release of the two shackles becomes greater.

SUMMARY OF THE INVENTION

Accordingly, it is an object of this invention to provide a clevis assembly having a retractable or folding clevis for supporting an airborne store, wherein the clevis is movable between an extended position and a retracted and stowed position. In the extended position, the clevis projects out from the munition to be engaged by the shackle of an ejector or rack and, in that position, is restrained from rotation and thereby provides longitudinal restraint to the store.

This and other objects of the invention are attained in a preferred embodiment of a clevis assembly having a retractable or folding clevis which, in its extended position may be engaged by an ejector shackle, and is rotatably supported in a clevis housing by a pivot pin. The pivot pin has a non-round profile along a portion of its length which nests into a complementary shaped opening when the clevis is in its extended position to prevent rotation of the clevis about the axis of the pin, but which disengages from the complementary shaped opening when the clevis is released by the shackle and drops into a recess in the clevis housing so the clevis is then free to be rotated into its fully stowed position in the housing recess by the airstream past the munition.

DESCRIPTION OF THE DRAWINGS

The invention, and its many attendant objects and advantages, will become better understood upon reading the following detailed description of the preferred embodiment in conjunction with the following drawings, wherein:

FIG. 2 is a schematic elevation of a typical munitions ejector, showing two shackles, each engaging the folding clevis of a clevis assembly according to this invention;

FIG. 3 is an exploded isometric view of a clevis assembly according to this invention, showing the folding clevis and attached pivot pin exploded out of the housing; and FIG. 4 is a cross-sectional view of the clevis assembly according to this invention, showing a central block within the housing.

DESCRIPTION OF THE PREFERRED EMBODIMENT

Figure 1:
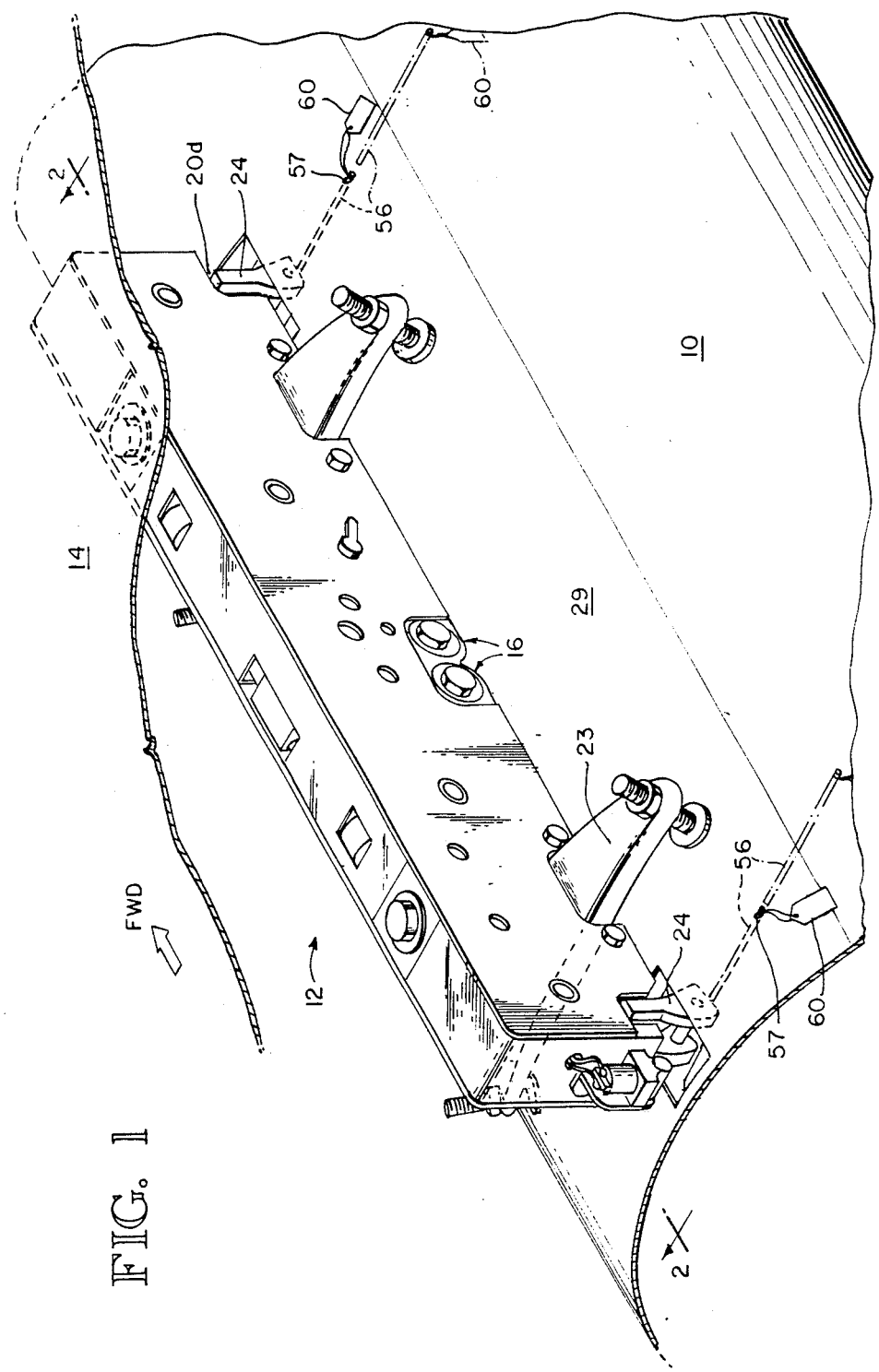
FIG. 1 is an isometric view of a missile having a pair of clevis assemblies according to this invention, each having a folding clevis engaged by a shackle of a typical munitions ejector.

Turning now to the drawings, wherein like reference characters designate identical or corresponding parts, and more particularly to FIG. 1 thereof, a portion of an airborne store such as a missile 10 is shown supported by an ejector 12 mounted on the underside of the fuselage of an attack aircraft 14. The ejector 12, such as the MAU-12B/A illustrated, can be mounted on the aircraft fuselage or wing and is remotely operated from within the aircraft by electrically initiating two ejector cartridges 16 which unlock a linkage system 18, shown in FIG. 2, in the ejector to allow a set of shackles 20 a–d to rotate under the weight of the missile 10 which hangs from the shackles 20 by way of a pair of clevis assemblies 22. These clevis assemblies 22 are the subject of this invention.

The missile 10 is supported vertically by the clevis assemblies 22 and is supported against sideways or lateral motion by sway braces 23 extending laterally out from both sides of the ejector, front and rear, which also provide a downward component of force to secure a folding clevis 24 in each clevis assembly 22 in its vertical position, as discussed in more detail below. The folding clevis 24, when held in its vertical position, also provides longitudinal restraint for the missile, as explained below, without the need for separate shear pins or other mechanical restraint.

As shown in FIG. 3, the folding clevis 24 is mounted in a U-shaped recess 25 of a housing 26 by a pivot pin 28. Each housing 26 is in the form of a solid block, sometimes known as a clevis block, having a central piece or block 27 (shown in phantom lines in FIG. 3 for clarity) with an upper surface flush with the upper surface of the housing 26. The housing 26 is mounted on the top or raceway 29 of the missile, at equally spaced positions fore and aft of the center of gravity, by fasteners extending through the fore and aft lips of the housing 26. The clevis 24 has two parallel spaced-apart legs 30, connected at their top ends by a clevis cross bar 31. Each leg 30 has one flat edge 32 on the upstream or forwardly facing side which lies flush with the top surface 34 of the housing 26 when the clevis is folded down and stowed in the housing recess 25.

The clevis legs 30 each have a downstream or rearwardly facing edge 36 which forms a curve 38 where it meets the bottom edge 40, to facilitate rotation of the clevis to its stowed position. The lower end of the upstream edge 32, on the other hand, forms a sharp corner 42 at the lower end of the edge 32 where it meets the bottom edge 40. This sharp corner 42 forms a closure for the top surface 34 of the housing 26 when the clevis 24 is in the folded and stowed position.

The pivot 28 pin is attached rigidly to the legs of the clevis 24 as by pressing with an interference fit into complementary shaped holes 44 in the clevis legs 30, and extends between and beyond both legs and through an elongated opening 46 in each side of the housing 26 and the block 27. The openings 46 each have a top portion 48 which has the same non-round profile as the cross-sectional shape of the top of the pivot pin 28 so that, when the clevis is rotated upright so the non-round portion of the pivot pin is facing upward, and when the clevis is lifted to raise the pivot pin and nest it into the top portion 48 of the openings 46, the non-round profile of the pivot pin is engaged in the complementary shaped non-round profile of the top portion 48 of the openings 46. The clevis will then be restrained from rotation until it is released to drop or retract slightly into the housing recess 25 far enough to allow the non-round portion of the pin 28 to clear the complementary non-round profile of the top portion 48 of openings 46, whereupon it can rotate in the lower portion of the openings 46 and the clevis can rotate into the housing recess 25.

The non-round cross-section of the pivot pin 28 is designed to serve three functions: (1) to fix the pin 28 in the clevis legs 30 against rotation relative thereto; (2) to provide torque resistance of the pin 28 (and attached clevis legs 30) in the housing 26 when the clevis 24 is in its vertical and extended position; and (3) to provide a self-releasing and camming action of the pin 28 in the openings 46 to ensure that the pin 28 will not jam in the openings 46 when the clevis 24 is released, but instead will rotate, under the action of the windstream past the vehicle, and will cam the clevis into its retracted position as it rotates toward its stowed position.

The particular non-round cross-section disclosed for the pin 28 is a pear-shaped figure formed by milling two flat faces 50 in a cylindrical pin at opposite 60° angles from the horizontal, one on each side of the pin 28. Each flat face 50 forms a chord across the original circular cross-section of the pin, which chords subtend two 60° angles and are spaced apart by a 60° arc centered on a vertical plane in which the axis of the pin 28 lies. The profile of the top portion 48 of each of the openings 46 is identical to the cross-sectional configuration of the pin, i.e. having symmetrical flat faces 52 at opposite 60° angles, subtending a 60° angle and spaced on both sides of a 60° arc vertically centered between the flats. Angles other than 60° also work well within the range of about 45° to about 75°, and preferably between 55° and 65°, provided that the same angle is used for both the pin 28 and the openings 46. The engagement of the flat faces 52 of the top end 48 of the opening 46 with the flat faces 50 on the pin 28 prevents the pin 28 from turning in the openings 46 without moving downwardly into the recess 25, toward the retracted position of the clevis.

In storage or in ground operations, downward movement of the pin 28 in the openings 46 is prevented by a ground safety pin 56, discussed below. When the missile is hanging from the ejector 12 on the aircraft, movement of the pin downwardly in openings 46 is prevented by the weight of the missile hanging by the clevis, augmented by the downward force exerted by the sway braces 23. This downward force is not removed until the shackles 20 on the ejector are unlocked to release the clevises 24, at which time the clevis assembly 22 is in free-fall and is acted upon primarily by the windstream which rotates it to the rear and into its recess 25.

The ground safety pin 56 is a hardened steel cylindrical pin which is long enough to be inserted laterally into the housing 26 through an opening 57 in the side of raceway 29. The pin extends through a hole 58 in the housing 26 between the bottom of the recess 25 and the bottom edge 40 of the clevis legs 30, thereby holding the clevis legs 30 and the pivot pin 28 in their uppermost positions. In this position, the pivot pin 28 is prevented from rotation in the top portion 48 of the openings 46 so the clevis is effectively locked in its raised, upright position. The ground safety pin 56 facilitates loading of the missile to the ejector and is a safety feature as the operator does not have to support the clevises in their upright position with his fingers during the loading operation.

In operation, a missile to be loaded onto a delivery aircraft from a weapons depot is selected for transportation to the loading area. To raise the clevis from its stowed position to its upright, extended position, the forward/top corner 42 of the clevis legs 30 are pressed downward which causes the clevis 24 to rotate slightly, lifting the clevis cross bar 31 far enough to be grasped and rotated upward, then lifted to the upright and extended position. While the clevis is held in its upright, extended position, the ground safety pin 56 is inserted through its receptor hole in the raceway 29 and into the hole 58 in the housing 26, underlying the bottom edge 40 of the clevis legs 30. The clevis is now securely locked in its upright, extended position from which it cannot move or rotate.

The missile is lifted from its rack in the weapons depot by the weapons transporter by engaging the clevis or other weapon hard points. The missile is thus carried to the loading area and raised to its carried position beneath the ejector 12. The ejector shackles 20 are each rotated downward to engage its respective clevis 24, and are locked in the engaged position by a lock bar 59 operated by a handle (not shown) on the ejector 12. The pads on the sway braces 23 are screwed down against the missile to exert the laterally spaced pushing forces to secure the missile in position. The ground safety pin 56 may now be removed and the missile remains firmly secured against longitudinal as well as lateral motion. A tug 60 may be attached to the ground safety pin to remind ground support personnel to remove the pin after the missile has been up-loaded to the aircraft.

When an aircraft carrying the missile 10 takes off, the acceleration force exerted on the clevises 24 by the shackles 20 tending to rotate the clevis 24 is resisted by the flat faces 50 on the pin 28 interfering with the flat faces 52 on the top portion 48 of the opening 46. That interference is maintained by the action of the sway braces holding the missile down. The missile is thus securely restrained in the longitudinal direction.

At the drop location, the pilot electrically activates the ejector cartridges 16 which unlocks and releases the linkage 18. The shackles 20(a) and 20(d) immediately pivot toward each other by reason of the overturning moment, that is, the moment created by the vertical line of action of the weight of the missile suspended from the clevises 24, which is longitudinally off-set from the vertical projection of the pivot axis of the shackle 20. The downward motion of the missile 10 is facilitated by a pair of gas pistons 62 powered by the ejector cartridges 16 momentarily after disengagement of the shackles 20.

As soon as the upward force exerted by the shackles 20 on the clevises 24 is removed, and the missile is in free fall or forward powered flight, the primary forces acting on the clevises 24 will be the rearward force of the wind stream and gravity. The self-caming profile of the pivot pin 28 and the top portion 48 of the openings 46 causes the pin 28 and attached clevis 24 to retract downwardly into the recess 25 as it rotates. The continued force of the windstream rotates the clevis 24 fully to the rear and into its stowed positon in the recess 25.

The invention thus provides a reliable and lightweight clevis assembly having a folding clevis for supporting airborne stores. It provides secure longitudinal restraint of the store until released, and then retracts and stows itself in the housing recess under the action of the windstream past the store. The retracted or folded clevis presents a very smooth aerodynamic surface for minimal drag or other aerodynamic disruption to the speed or maneuverability of the missile. It also presents a minimal radar cross-section and is suitable for known techniques for reducing further the radar return signal. The invention may be used as a replacement for all lugs presently in use and is compatible with all ejectors now in use. The extra mechanisms now used on ejectors to provide longitudinal restraint may be removed to lighten the ejector, and the folding clevis of this invention may be substituted for existing lugs with no weight penalty.

Obviously, numerous modifications and variations of the above-described preferred embodiment will occur to those skilled in the art in view of this disclosure. No attempt has been made herein to identify these numerous modifications; however, it is expressly to be understood that these modifications, and the equivalents thereof, may be practiced without departing from the spirit and scope of the invention as defined in the following claims.

I claim:

1. A clevis assembly for an airborne store, comprising:
   a clevis block having means therein defining a recess, and having an exterior surface adapted to be mounted flush with an exterior surface of the airborne store;
   a clevis movable between an extended position in which the store can be supported from an ejector shackle carried by an aircraft, and a vertically retracted position translated partially into said recess, and a stowed position in which it is rotated fully into said recess flush with said exterior surface of said clevis block after the store is dropped from the aircraft, said clevis having two parallel legs, each having an inner end pivotally connected to said clevis block, and each having an outer end connected to the other of said legs by a cross bar, said clevis presenting a generally U-shaped outline for reception of said ejector shackle for selectively supporting said clevis and for releasing said clevis to allow the airborne store to be released from said shackle at the desired moment;

a horizontally disposed pivot pin having a non-round profile along at least a load bearing portion of the length of said pivot pin on a vertical extremity thereof when said clevis is in its extended position, said pivot pin extending through said inner end of each of said clevis legs and into said clevis block;

means in one of said clevis block and said leg inner ends defining, when said clevis is in its extended position, a hole into which said pivot pin extends, said hole being vertically elongated and having a non-round vertical extremity similar in shape to the shape of the non-round vertical extremity of said non-round portion of said pivot pin;

whereby said non-round vertical extremity of said pin fits into said non-round vertical extremity of said hole when said clevis is in its extended position so that said clevis is restrained from rotating until it retracts to its vertically retracted position.

2. The clevis assembly defined in claim 1, wherein said pivot pin is fixed in said leg inner ends and said hole extends in said clevis block.

3. The clevis assembly defined in claim 1, wherein said pivot pin is fixed in said clevis block, and said hole extends in said leg inner ends.

4. The clevis assembly defined in claim 1, wherein said clevis has an upstream facing exterior surface having a certain shape and size, and said recess has a cross-sectional shape and size in the plane of the exterior surface of said clevis block that is substantially equal to said certain shape and size of said upstream facing exterior surface of said clevis, whereby said clevis, when stowed in said recess, presents a smooth aerodynamic profile to an airflow past the exterior surface of said store in which said clevis block is mounted with its exterior surface flush with the exterior surface of said store.

5. The clevis assembly defined in claim 4, further comprising a central block which is sized and positioned in said recess so as to receive said pivot pin and fill the space within said U-shaped outline of said clevis when said clevis is in the stowed position thereof, thereby to present a smooth exterior surface of said lug when said clevis is in its stowed position.

6. A clevis assembly for hanging a store on an aircraft and providing longitudinal restraint of the store until the store is released from the aircraft, comprising:

a clevis block having means for attachment to said store, and having an upper surface with means therein defining a recess;

a clevis having two spaced-apart legs connected at adjacent ends of said legs by a cross bar, said clevis cross bar adapted to receive and engage an ejector shackle for supporting said clevis and for releasing said clevis to allow the airborne store to be released from said shackle at the desired moment;

a horizontally disposed pivot pin having a non-round, self-releasing profile along at least a load bearing portion of the length of said pivot pin on a vertical extremity thereof when said clevis is in its extended position, said pivot pin extending through the ends of both of said clevis legs and into said clevis block;

means in one of said clevis block and said leg remote ends defining, when said clevis is in its extended position, a vertically elongated hole into which said pivot pin extends, said vertically elongated hole having a non-round vertical extremity similar in shape to the shape of the non-round vertical extremity of said non-round portion of said pivot pin;

whereby said non-round vertical extremity of said pin fits into said non-round vertical extremity of said hole when said clevis is in its extended position so that said clevis is restrained from rotating until it retracts to its vertically stowed position.

7. The clevis assembly defined in claim 6, further comprising a central block in a central region of said clevis block having an upper surface flush with the upper surface of said clevis block, said recess being a U-shaped recess defined between said clevis block and said central block to receive said clevis and to present a smooth, substantially continuous upper surface when said clevis is in its retracted and stowed position.

8. The clevis assembly defined in claim 6 wherein said vertically elongated hole is in said clevis block and said pivot pin is fixed in said clevis legs.

9. The clevis assembly defined in claim 8, further comprising:

a central block in a central region of said clevis block having an upper surface flush with the upper surface of said clevis block;

said central block having a vertically elongated hole horizontally aligned with said vertically elongated hole in said clevis block and having the same cross-sectional shape and size.

10. A clevis assembly for hanging a store on an aircraft and providing longitudinal restraint of the store until the store is released from the aircraft, comprising:

a clevis block having means for attachment to said store, and having means in said clevis block defining a recess;

a clevis having two spaced-apart legs connected at adjacent ends of said legs by a cross bar, said clevis cross bar adapted to receive and engage an ejector shackle for supporting said clevis and for releasing said clevis to allow the airborne store to be released from said shackle at the desired moment;

a horizontally disposed pivot pin having a non-round, self-releasing profile along at least a load bearing portion of the length of said pivot pin on a vertical extremity thereof when said clevis is in its extended position, said pivot pin extending through the ends of both of said clevis legs and into said clevis block;

said pivot pin having two flat faces lying parallel to the axis of said pin and symmetrically positioned on either side of a vertical plane in which said axis lies when said clevis is in its vertical, upright position, said flats lying at an angle of about 45°–75° from the horizontal;

means in one of said clevis block and said leg remote ends defining, when said clevis is in its extended position, a vertically elongated hole into which said pivot pin extends, said vertically elongated hole having a non-round vertical extremity similar in shape to the shape of the non-round vertical extremity of said non-round portion of said pivot pin;

whereby said non-round vertical extremity of said pin fits into said non-round vertical extremity of said hole when said clevis is in its extended position so that said clevis is restrained from rotating until it retracts to its vertically stowed position.

11. The clevis assembly defined in claim 10, wherein said angle is 55°-65°.

12. A method for vertically supporting an airborne store from two shackles on an aircraft and securing said store against lateral and longitudinal translation relative to said supporting aircraft, and for retracting all hanging hardware attached to said store within or flush with the mold line of said store and out of the wind stream past said store, comprising:

in each of two housings in said store, supporting a clevis on a pivot pin extending on an axis normal to the longitudinal axis of said store through each of two housings in said store and through two legs of said clevis;

in each of said housings, engaging a load bearing non-round profile of said pivot pin with a load bearing non-round profile of an elongated hole through one of said housing and said clevis legs;

engaging each clevis with one each of said shackles, and locking said shackles in their engaged position;

exerting a pushing force on said store away from said shackles to pressurize an interface between said pivot pin and said hole and thereby prevent relative rotation therebetween so that said clevis is prevented from rotation relative to said housing;

unlocking said shackles and allowing them to swing away from, and release, said clevises;

camming said clevises down into said housing during flight of said store by the action of the windstream past said store exerting a rearward force on said clevis, and causing said non-round profiles on said pin and said hole to push said clevises down into said housing as said clevises rotate about the axes of said pivot pins.

13. The method defined in claim 12, wherein each of said pivot pins is fixed in a respective one of each of said clevises and said elongated holes extend through said housing.

14. The method defined in claim 12, wherein said hole has a primary direction of elongation lying in the vertical direction.

15. The method defined in claim 14, wherein said non-round profile lies at the vertically upward extremity of said hole.

16. A method for vertically supporting an airborne store from two shackles on an aircraft and securing said store against lateral and longitudinal translation relative to said supporting aircraft, and for retracting all hanging hardware attached to said store within or flush with the mold line of said store and out of the wind stream past said store, comprising:

in each of two housings in said store, supporting a clevis on a pivot pin extending on an axis normal to the longitudinal axis of said store through each of two housings in said store and through two legs of said clevis;

in each of said housings, engaging a load bearing non-round profile of said pivot pin with a load bearing non-round profile of an elongated hole through one of said housing and said clevis legs;

said non-round profile of said pivot pin being produced by two flats on an otherwise cylindrical pivot pin, and said flats lying on opposite sides of the vertical projection of said pin when said clevis is in its upstanding position and making equal opposite angles with the horizontal;

engaging each clevis with one each of said shackles, and locking said shackles in their engaged position;

exerting a pushing force on said store away from said shackles to pressurize an interface between said pivot pin and said hole and thereby prevent relative rotation therebetween so that said clevis is prevented from rotation relative to said housing:

unlocking said shackles and allowing them to swing away from, and release, said clevises;

camming said clevises down into said housing during flight of said store by the action of the windstream past said store exerting a rearward force on said clevis, and causing said non-round profiles on said pin and said hole to push said clevises down into said housing as said clevises rotate about the axes of said pivot pins.

17. The method defined in claim 16, wherein said angles are within the range of about 45°-75°.

18. The method defined in claim 17, wherein said angles are within the range of 55°-65°.

19. A method for vertically supporting an airborne store from two shackles on an aircraft and securing said store against lateral and longitudinal translation relative to said supporting aircraft, and for retracting all hanging hardware attached to said store within or flush with the mold line of said store and out of the wind stream past said store, comprising:

in each of two housings in said store, supporting a clevis on a pivot pin extending on an axis normal to the longitudinal axis of said store through each of two housings in said store and through two legs of said clevis;

in each of said housings, engaging a load bearing non-round profile of said pivot pin with load bearing non-round profile of an elongated hole through one of said housing and said clevis legs;

locking said clevises in their upright, extended position by inserting a ground safety pin between said clevises and the bottom of said housing when said clevises are in their upright and extended position to prevent them from dropping to their retracted position in which said non-round profiles are disengaged, whereby said clevises are restrained from rotation when said ground safety pin is in place;

engaging each clevis with one each of said shackles, and locking said shackles in their engaged position;

exerting a pushing force on said store away from said shackles to pressurize an interface between said pivot pin and said hole and thereby prevent relative rotation therebetween so that said clevis is prevented from rotation relative to said housing;

removing said ground safety pins from between said clevises and the bottoms of said housing;

unlocking said shackles and allowing them to swing away from, and release, said clevises; and camming said clevises down into said housing during flight of said store by the action of the windstream past said store exerting a rearward force on said clevis, and causing said non-round profiles on said pin and said hole to push said clevises down into said housing as said clevises rotate about the axes of said pivot pins.

20. The method defined in claim 19, wherein said ground safety pin is inserted through a hole in said housing lying beneath said pivot pin.

21. A clevis assembly for supporting an airborne store from an aircraft, secure against translation in a longitudinal direction relative to the aircraft, comprising:
- a clevis block having means therein defining an upwardly opening recess and having a hole therein on a horizontal axis, extending transverse to said longitudinal direction, for receiving a pivot pin;
- a clevis having two parallel legs, each having an opening therethrough disposed coaxially on a horizontal axis;
- a pivot pin extending through said hole and said openings, and being fixed in one of said hole and said openings, to pivotally connect said clevis in said clevis block for pivotal movement therein between an extended position in which said clevis stands upright and projects above said clevis block, and a retracted and stowed position in which said clevis lies fully within said recess;
- said pivot pin having a non-round profile along a vertical extremity when said clevis is in its extended position, and being vertically translatable in the other of said hole and said openings;
- the other of said hole and said openings being vertically elongated and having a non-round profile, similar in shape to the pivot pin non-round profile, on the same vertical extremity thereof as on the pivot pin, and facing the non-round profile of said pivot pin when said clevis is in its extended position;
- whereby said pivot pin will turn freely in said other of said hole and said openings, and will vertically translate relative thereto until said non-round profile of said pivot pin engages and nests with said non-round profile of said vertical extremity of said other of said hole and said openings, whereupon relative rotation therebetween will be prevented until vertical translation therebetween is permitted.

22. The clevis assembly defined in claim 21, wherein:
- said hole is vertically elongated, and said pivot pin is fixed in said openings;
- said clevis being rotatably mounted in said clevis block such that rotation to said extended position of said clevis orients said pivot pin with its non-round profile facing said non-round profile of said hole;
- whereby vertical translation of said clevis moves said pivot pin non-round surface into nested engagement with said hole non-round surface to prevent rotation of said pivot pin and said clevis until they are vertically translated downward away from nested engagement.

23. A clevis assembly for supporting an airborne store from an aircraft, secure against translation in a longitudinal direction relative to the aricraft, comprising:
- a clevis block having means therein defining an upwardly opening recess and having a hole therein on a horizontal axis, extending transverse to said longitudinal direction, for receiving a pivot pin;
- a clevis having two parallel legs, each having an opening therethrough disposed coaxially on a horizontal axis;
- a pivot pin extending through said hole and said openings, and being fixed in one of said hole and said openings, to pivotally connect said clevis in said clevis block for pivotal movement therein between an extended position in which said clevis stands upright and projects above said clevis block, and a retracted and stowed position in which said clevis lies fully within said recess;
- said pivot pin having a non-round profile along a vertical extremity when said clevis is in its extended position, and being vertically translatable in the other of said hole and said openings, said non-round profile on said pivot pin including two flat faces lying parallel to the axis of said pivot pin, disposed symmetrically on either side of a vertical plane in which said axis lies when said clevis is in said extended position;
- the other of said hole and said openings being vertically elongated and having a non-round profile, similar in shape to the pivot pin non-round profile, on the same vertical extremity thereof as on the pivot pin, and facing the non-round profile of said pivot pin when said clevis is in its extended position;
- whereby said pivot pin will turn freely in said other of said hole and said openings, and will vertically translate relative thereto until said non-round profile of said pivot pin engages and nests with said non-round profile of said vertical extremity of said other of said hole and said openings, whereupon relative rotation therebetween will be prevented until vertical translation therebetween is permitted.

24. The clevis assembly defined in claim 23, wherein said two flat faces make equal and opposite angles within the range of 45°–75° with the horizontal when said clevis is in its extended position.

25. A clevis assembly for supporting an airborne store from an aircraft, secure against translation in a longitudinal direction relative to the aircraft, comprising:
- a clevis block having means therein defining an upwardly opening recess and having a hole therein on a horizontal axis, extending transverse to said longitudinal direction, for receiving a pivot pin;
- a clevis having two parallel legs, each having an opening therethrough disposed coaxially on a horizontal axis;
- a pivot pin extending through said hole and said openings, and being fixed in one of said hole and said openings, to pivotally connect said clevis in said clevis block for pivotal movement therein between an extended position in which said clevis stands upright and projects above said clevis block, and a retracted and stowed position in which said clevis lies fully within said recess;
- said pivot pin having a non-round profile along a vertical extremity when said clevis is in its extended position, and being vertically translatable in the other of said hole and said openings;
- the other of said hole and said openings being vertically elongated and having a non-round profile, similar in shape to the pivot pin non-round profile, on the same vertical extremity thereof as on the pivot pin, and facing the non-round profile of said pivot pin when said clevis is in its extended position;
- a safety pin hole (58) extending parallel to and beneath said pivot pin hole (48);
- a safety pin (56) for insertion into said safety pin hole (58), positioned so as to hold said clevis in its extended position with said non-round profiles nested and firmly engaged so that said clevis is prevented from rotating while said safety pin is in place in said safety pin hole (58);

whereby said pivot pin will turn freely in said other of said hole and said openings, and will vertically translate relative thereto until said non-round profile of said pivot pin engages and nests with said non-round profile of said vertical extremity of said other of said hole and said openings, whereupon said safety pin can be inserted in said safety pin hole to prevent said vertical translation, and relative rotation of said clevis will be prevented until said vertical translation is permitted.

* * * * *